United States Patent
Wei et al.

(10) Patent No.: US 11,680,185 B2
(45) Date of Patent: Jun. 20, 2023

(54) AQUEOUS POLYURETHANE DISPERSION WITH NON-IONIC REACTIVE EMULSIFIER AND SULFONATE GROUP

(71) Applicant: Shanghai Sisheng Polymer Materials Co., Ltd., Shanghai (CN)

(72) Inventors: Ziao Wei, Shanghai (CN); Yuchun Wei, Shanghai (CN)

(73) Assignee: Shanghai Sisheng Polymer Materials Co., Ltd., Shanghai (CN)

( * ) Notice: Subject to any disclaimer, the term of this patent is extended or adjusted under 35 U.S.C. 154(b) by 304 days.

(21) Appl. No.: 16/945,213

(22) Filed: Jul. 31, 2020

(65) Prior Publication Data
US 2020/0385608 A1    Dec. 10, 2020

(30) Foreign Application Priority Data
Jun. 1, 2019   (CN) .......................... 201910495639.4

(51) Int. Cl.
| | | |
|---|---|---|
| *C09D 175/08* | (2006.01) | |
| *C08G 18/32* | (2006.01) | |
| *C08G 18/38* | (2006.01) | |
| *C08G 18/48* | (2006.01) | |
| *C08G 18/66* | (2006.01) | |
| *C08J 3/07* | (2006.01) | |
| *C08G 18/10* | (2006.01) | |
| *C08G 18/22* | (2006.01) | |
| *C08G 18/42* | (2006.01) | |
| *C08G 18/44* | (2006.01) | |
| *C08G 18/73* | (2006.01) | |
| *C08G 18/75* | (2006.01) | |
| *C08G 18/76* | (2006.01) | |
| *C09D 175/04* | (2006.01) | |
| *C09D 175/06* | (2006.01) | |
| *C08G 18/08* | (2006.01) | |

(52) U.S. Cl.
CPC ....... *C09D 175/08* (2013.01); *C08G 18/0828* (2013.01); *C08G 18/10* (2013.01); *C08G 18/227* (2013.01); *C08G 18/3206* (2013.01); *C08G 18/3231* (2013.01); *C08G 18/3855* (2013.01); *C08G 18/4238* (2013.01); *C08G 18/44* (2013.01); *C08G 18/4804* (2013.01); *C08G 18/4833* (2013.01); *C08G 18/4854* (2013.01); *C08G 18/6685* (2013.01); *C08G 18/73* (2013.01); *C08G 18/755* (2013.01); *C08G 18/758* (2013.01); *C08G 18/765* (2013.01); *C08G 18/7621* (2013.01); *C08G 18/7642* (2013.01); *C08J 3/07* (2013.01); *C09D 175/04* (2013.01); *C09D 175/06* (2013.01); *C08J 2375/08* (2013.01)

(58) Field of Classification Search
CPC ............ C08G 18/3206; C08G 18/3231; C08G 18/3855; C08G 18/4804; C08G 18/4833; C08G 18/4854; C08G 18/6685; C08G 18/10; C08G 18/227; C08G 18/4238; C08G 18/44; C08G 18/73; C08G 18/755; C08G 18/758; C08G 18/7621; C08G 18/7642; C08G 18/765; C08G 18/0828; C08J 3/07; C08J 2375/08; C09D 175/08; C09D 175/04; C09D 175/06

See application file for complete search history.

(56) References Cited

U.S. PATENT DOCUMENTS

2009/0105411 A1*   4/2009   Erdem ............... C08G 18/7657
                                                              524/591

FOREIGN PATENT DOCUMENTS

| CN | 102112510 A | 6/2011 |
|---|---|---|
| CN | 103865031 A | 6/2014 |
| CN | 106883370 A | 6/2017 |

OTHER PUBLICATIONS

Odian, George, Principles of Polymerization, Third Edition, John Wiley & Sons, Inc., 1991, pp. 19-24.*
Machine English translation of CN 106883370, Su et al., Jun. 23, 2017.*

* cited by examiner

*Primary Examiner* — Patrick D Niland
(74) *Attorney, Agent, or Firm* — Cesari & McKenna, LLP

(57) ABSTRACT

The present invention relates to a method for preparing an aqueous polyurethane (PU) dispersion with non-ionic reactive emulsifiers and sulfonate groups. The aqueous PU dispersion includes the following components: 10-40 parts by weight of polymer polyol, 5-20 parts by weight of isocyanate monomer, 0.1-1.5 parts by weight of trimethylolpropane, 3-15 parts by weight of monofunctional alkoxy polyethylene glycol or propylene glycol, 0.5-2.0 parts by weight of diaminosulphonate chain extender, 0.5-3.0 parts by weight of non-ionic organic amine chain extender, 0.01-0.05 parts by weight of catalyst, 0-8 parts by weight of organic solvent, 50-80 parts by weight of deionized water, and 0.1-5 parts by weight of thickener. In the presence of non-ionic reactive emulsifiers, introduction of sulfonate groups at late chain extension stage of the aqueous PU dispersion obtain stable large-size polymer particles. A coating film thereof has a 60° gloss of <1.0; the emulsion has excellent storage stability and redispersibility.

18 Claims, No Drawings

AQUEOUS POLYURETHANE DISPERSION WITH NON-IONIC REACTIVE EMULSIFIER AND SULFONATE GROUP

CROSS REFERENCE TO RELATED APPLICATIONS

This application claims priority to Chinese Application No. 201910495639.4, filed on Jun. 1, 2019, the content of this application being hereby incorporated by reference in its entirety.

TECHNICAL FIELD

The present invention relates to the field of polymer material, and in particular to a method for preparing an inherent matting aqueous polyurethane (PU) dispersion. The emulsion has excellent storage stability and redispersibility, and a coating film prepared therefrom has extremely low gloss and excellent transparency.

BACKGROUND

Due to advantages of incombustibility, no environmental pollution, and energy saving, waterborne PU has been developed in China and overseas, and use thereof is more and more extensive.

Besides well-known and excellent properties of the waterborne PU, a coating thereof has particularly important optical properties. In polymer coatings, an important optical measure is gloss; besides material characteristics of a finish, roughness of the finish plays an important role. Therefore, a rough finish always has a low gloss. For some applications, the gloss is needed to keep as low as possible, and even the surface is mat.

In general, a matting coating can be obtained by adding an extra matting agent. For example, inorganic silica matting agents can achieve a low gloss. However, an disadvantage of matting agents is failure to form a continuous film; moreover, matting agents are not fixed firmly because of incompatibility thereof with organic polymer components in a coating; therefore, these matting agents can flake off the coating relatively easily, so that surface finish increases over time and an ideal matting effect is lost gradually. Besides inorganic matting agents, such organic polymer particles as PU and polyacrylate (PA) may also be added to obtain a low-gloss finish. Organic polymer particles are compatible with polymers in the coating and increases scratch resistance of a finish, but the matting effect thereof is generally poor, along with poor transparency of the coating film. In addition, addition of an extra matting agent shows some disadvantages during use in a waterborne coating system, such as thickening, sedimentation, agglomeration, decreased physical properties of the coating film, heterogeneous surface photoeffect of a material.

Currently, inherent matting aqueous PU resin is urgently needed on the market. In an aqueous PU dispersion, particles have to possess a relatively large particle size and a wide particle size distribution; after film formation, the coating film has a trace of particles and forms a rough finish, in order to obtain a low-gloss coating surface. In general, polymer particles with large particle size and wide particle size distribution are difficult to keep stable in a polymer emulsion, so that agglomeration and agglutination appear and redispersion becomes difficult. One of the effective ways to solve the above problem is to introduce sulfonate groups into a macromolecular structure of a polymer. Anionic PU aqueous dispersions are used in China Patents CN102112510B and CN103865031B, which use diaminosulphonate as a chain extender to introduce sulfonate groups. The diaminosulphonate, as a strong electrolyte, agglomerates anionic PU very easily during chain extension reaction.

SUMMARY

An objective of the present invention is to overcome the defect of the prior act, and to provide a method for preparing an aqueous PU dispersion with non-ionic reactive emulsifiers and sulfonate groups. A coating film thereof has extremely low gloss and excellent transparency, and the emulsion per se has excellent redispersibility and storage stability.

The present invention adopts the following technical solution to solve the above problem: an aqueous PU dispersion with non-ionic reactive emulsifiers and sulfonate groups, including the following components:

10-40 parts by weight of polymer polyol;
5-20 parts by weight of isocyanate monomer;
0.1-1.5 parts by weight of trimethylolpropane (TMP);
3-15 parts by weight of monofunctional alkoxy polyethylene glycol (PEG) or polypropylene glycol (PPG);
0.5-2.0 parts by weight of diaminosulphonate chain extender;
0.5-3.0 parts by weight of non-ionic organic amine chain extender;
0.01-0.05 parts by weight of catalyst;
0-8 parts by weight of organic solvent;
50-80 parts by weight of deionized water; and
0.1-5 parts by weight of thickener.

Specifically, polymer polyol content may be 10, 15, 20, 25, 35, or 40%;
isocyanate monomer content may be 5, 8, 10, 12, 15, 18, or 20%;
TMP content may be 0.1, 0.3, 0.5, 1.0, 1.3, or 1.5%;
monofunctional alkoxy PEG or PPG content may be 3, 5, 7, 9, 12, or 15%;
diaminosulphonate chain extender content may be 0.5, 0.8, 1.2, 1.5, 1.8, or 2.0%;
non-ionic organic amine chain extender content may be 0.5, 1.0, 1.5, 2.0, 2.5, or 3.0%;
catalyst content may be 0.01, 0.02, 0.03, 0.04, or 0.05%;
organic solvent content may be 0, 1, 2, 3, 4, 5, 6, 7, or 8%;
deionized water content may be 50, 55, 60, 65, 70, 75, or 80%; and
thickener content may be 0.1, 0.5, 1.0, 2.0, 3.0, 4.0, or 5.0%.

Based on the above technical solution, the polymer polyol is an organic polyhydroxy compound known in the PU coating technology, e.g., conventional polyester polyols, polytetrahydrofuran polyols, polyether polyols containing ethylene oxide (EO) and propylene oxide (PO), polycaprolactone polyols, polycarbonate polyols, and polyacrylate polyols; molecular weights thereof range from 500 to 4,000, and functionality thereof ranges from 2 to 3; these polymer polyols are used alone or as mixtures.

Based on the above technical solution, the isocyanate monomer is one of isophorone diisocyanate (IPDI), dicyclohexylmethane diisocyanate (HMDI), hexamethylene diisocyanate (HDI), tetramethylxylene diisocyanate (TMXDI), xylylene diisocynate (XDI), 2,4- and/or 2,6-toluene diisocyanate (TDI), or a mixture of several kinds thereof.

Based on the above technical solution, the monofunctional alkoxy PEG or PPG has a molecular weight of 500-2,000 and a functionality of 1 and is used alone or as a mixture.

Based on the above technical solution, the catalyst is organotin, organobismuth, or organosilver.

Based on the above technical solution, the organic solvent is one or none of N-methyl pyrrolidone (NMP), dimethylacetamide (DMAC), dipropyleneglycol dimethyl ether, acetone, and butanone.

Based on the above technical solution, the non-ionic organic amine chain extender is one of ethylenediamine (EDA), 1,2-diaminopropane, 1,3-diaminopropane, 1,4-diaminobutane, hexamethylenediamine (HMDA), hydrazine hydrate, isophorone diamine (IPDA), diethylenetriamine (DETA), 4,4-diaminodicyclohexyl methane, and dimethylethylenediamine (DMEDA), or a mixture of several kinds thereof.

Based on the above technical solution, the diaminosulphonate chain extender is selected from one or a mixture of sodium 2-[(2-aminoethyl)amino]ethanesulphonate and sodium 3-[(2-aminoethyl)amino]propanesulfonate. An amount of the diaminosulphonate chain extender is 30-80% of the total of chain extenders by weight.

Based on the above technical solution, the thickener is one or a mixture of hydrophobically associating PU thickener and alkali swelling acrylic thickener.

Based on the above technical solution, an average particle size thereof ranges from 400 to 6,000 nm.

In view of a method for preparing the aqueous PU dispersion, prepolymer mixing process is used, including: step 1), adding polymer polyol, TMP, isocyanate monomer, catalyst, and organic solvent NMP in a reactor according to a formula, and reacting completely at 50-90° C.; and step 2), adding monofunctional alkoxy PEG or PPG according to the formula, and reacting completely at 50-90° C.; after cooling, dispersing the above reactants into deionized water at high speed, and reacting with non-ionic organic amine chain extender and diaminosulphonate chain extender for 20-40 min at 10-50° C. to obtain the aqueous PU dispersion, followed by thickening with a thickener. Alternatively, acetone process is used, including: step 1), adding polymer polyol, TMP, isocyanate monomer, catalyst, and acetone in a reactor according to a formula, and reacting completely at 50-60° C.; and step 2), adding monofunctional alkoxy PEG or PPG according to the formula, and reacting completely at 50-60° C.; after cooling, dispersing the above reactants into deionized water at high speed, reacting with non-ionic organic amine chain extender and diaminosulphonate chain extender for 20-40 min at 10-50° C., and finally separating the acetone to obtain the aqueous PU dispersion, followed by thickening with a thickener.

The present invention has the following beneficial effects: The present invention obtains an inherent matting aqueous PU dispersion; a coating film thereof has a 60° gloss of <1.0; the emulsion per se has excellent redispersibility and storage stability.

DETAILED DESCRIPTION

Example 1

A preparation method was provided as follows: Prepolymer mixing process was used. In step 1), 14.4 parts by weight of polytetrahydrofuran polyol (molecular weight: 1,000), 0.4 parts by weight of TMP, 8.6 parts by weight of IPDI, 0.01 parts by weight of organobismuth catalyst, and 5 parts by weight of organic solvent NMP were added in a reactor and reacted completely at 80° C. In step 2), the above reactants were reacted completely with 5.8 parts by weight of monofunctional alkoxy PEG (molecular weight: 1,000) at 80° C. After cooling, the above reactants were dispersed into 62.59 parts by weight of deionized water at high speed, and reacted with chain extenders, i.e., 1.0 part by weight of hydrazine hydrate and 0.7 parts by weight of diaminosulphonate for 20-40 min at 20-30° C. to obtain an aqueous PU dispersion, followed by thickening with 1.5 parts by weight of thickener.

Example 2

A preparation method was provided as follows: Prepolymer mixing process was used. In step 1), 16.2 parts by weight of poly(hexylene adipate) diol (molecular weight: 2,000), 0.58 parts by weight of TMP, 8.0 parts by weight of HMDI, 0.01 parts by weight of organobismuth catalyst, and 5 parts by weight of organic solvent NMP were added in a reactor and reacted completely at 80° C. In step 2), the above reactants were reacted completely with 5.8 parts by weight of monofunctional alkoxy PEG (molecular weight: 1,000) at 80° C. After cooling, the above reactants were dispersed into 62.01 parts by weight of deionized water at high speed, and reacted with chain extenders, i.e., 0.8 parts by weight of hydrazine hydrate and 0.6 parts by weight of diaminosulphonate for 20-40 min at 20-30° C. to obtain an aqueous PU dispersion, followed by thickening with 1.0 part by weight of thickener.

Example 3

A preparation method was provided as follows: Acetone process was used. In step 1), 16.2 parts by weight of polycarbonate diol (molecular weight: 2,000), 0.58 parts by weight of TMP, 6.8 parts by weight of IPDI, 0.01 parts by weight of organobismuth catalyst, and 5.85 parts by weight of organic solvent acetone (finally separated, and not included in total weight percent) were added in a reactor and reacted completely at 55° C. In step 2), the above reactants were reacted completely with 5.8 parts by weight of monofunctional alkoxy PEG (molecular weight: 1,000) at 55° C. After cooling, the above reactants were dispersed into 67.78 parts by weight of deionized water at high speed, and reacted with chain extenders, i.e., 0.75 parts by weight of hydrazine hydrate and 0.58 parts by weight of diaminosulphonate for 20-40 min at 20-30° C., and finally the acetone was separated to obtain an aqueous PU dispersion, followed by thickening with 1.5 parts by weight of thickener.

Test results of the above three examples are as follows:

|  | Example 1 | Example 2 | Example 3 | Test method |
|---|---|---|---|---|
| Solid content (%) | 33 | 33 | 32 | GB/T1725-2007 |
| Storage stability | No agglutination or agglomeration | No agglutination or agglomeration | No agglutination or agglomeration | For 10 days at 50° C. |

-continued

|  | Example 1 | Example 2 | Example 3 | Test method |
| --- | --- | --- | --- | --- |
| Redispersibility | No residue or other debris | No residue or other debris | No residue or other debris | Filtering through 300-mesh filter cloth after stirring uniformly |
| 60° Gloss | 0.8 | 0.6 | 0.4 | By glossmeter |

What is claimed is:

1. An aqueous polyurethane (PU) dispersion with non-ionic reactive emulsifiers and sulfonate groups, comprising the following components:
   10-40 parts by weight of a polymer polyol;
   5-20 parts by weight of an isocyanate monomer;
   0.1-1.5 parts by weight of trimethylolpropane (TMP);
   3-15 parts by weight of a monofunctional alkoxy polyethylene glycol (PEG) or a monofunctional alkoxy polypropylene glycol (PPG);
   0.5-2 parts by weight of a diaminosulphonate chain extender;
   0.5-3 parts by weight of a non-ionic organic amine chain extender;
   0.01-0.05 parts by weight of a catalyst;
   0-8 parts by weight of an organic solvent;
   50-80 parts by weight of water; and
   0.1-5 parts by weight of a thickener.

2. The aqueous PU dispersion according to claim 1, wherein the polymer polyol, having a functionality of 2 to 3, is an organic polyhydroxy compound selected from the group consisting of polyester polyols, polytetrahydrofuran polyols, polyether polyols containing ethylene oxide (EO) and propylene oxide (PO), polycaprolactone polyols, polycarbonate polyols, polyacrylate polyols, and any combinations thereof.

3. The aqueous PU dispersion according to claim 1, wherein the isocyanate monomer is isophorone diisocyanate (IPDI), dicyclohexylmethane diisocyanate (HMDI), hexamethylene diisocyanate (HDI), tetramethylxylene diisocyanate (TMXDI), xylylene diisocyanate (XDI), 2,4-toluene diisocyanate, 2,6-toluene diisocyanate, or a mixture thereof.

4. The aqueous PU dispersion according to claim 1, wherein the monofunctional alkoxy PEG or PPG has a functionality of 1 and is used alone or as a mixture.

5. The aqueous PU dispersion according to claim 1, wherein the catalyst is organotin, organobismuth, or organosilver.

6. The aqueous PU dispersion according to claim 1, wherein the organic solvent is selected from the group consisting of N-methyl pyrrolidone (NMP), dimethylacetamide (DMAC), dipropyleneglycol dimethyl ether, acetone, and butanone.

7. The aqueous PU dispersion according to claim 1, wherein the non-ionic organic amine chain extender is ethylenediamine (EDA), 1,2-diaminopropane, 1,3-diaminopropane, 1,4-diaminobutane, hexamethylenediamine (HMDA), hydrazine hydrate, isophorone diamine (IPDA), diethylenetriamine (DETA), 4,4-diaminodicyclohexyl methane, dimethylethylenediamine (DMEDA), or a mixture thereof.

8. The aqueous PU dispersion according to claim 1, wherein the diaminosulphonate chain extender is sodium 2-[(2-aminoethyl)amino]ethanesulphonate, sodium 3-[(2-aminoethyl)amino]propanesulfonate, or a mixture thereof; and the amount of the diaminosulphonate chain extender is 30-80% of the total of chain extenders by weight.

9. The aqueous PU dispersion according to claim 1, wherein the thickener is a hydrophobically associating PU thickener, an alkali swelling acrylic thickener, or a mixture thereof.

10. A method for preparing the aqueous PU dispersion according to claim 1, wherein: prepolymer mixing process is used, comprising: step 1), adding polymer polyol, TMP, isocyanate monomer, catalyst, and organic solvent NMP in a reactor according to a formula, and reacting completely at 50-90° C.; and step 2), adding monofunctional alkoxy PEG or PPG according to the formula, and reacting completely at 50-90° C.; after cooling, dispersing the above reactants into deionized water at high speed, and reacting with non-ionic organic amine chain extender and diaminosulphonate chain extender for 20-40 min at 10-50° C. to obtain the aqueous PU dispersion, followed by thickening with a thickener; alternatively, acetone process is used, comprising: step 1), adding polymer polyol, TMP, isocyanate monomer, catalyst, and acetone in a reactor according to a formula, and reacting completely at 50-60° C.; and step 2), adding monofunctional alkoxy PEG or PPG according to the formula, and reacting completely at 50-60° C.; after cooling, dispersing the above reactants into deionized water at high speed, reacting with non-ionic organic amine chain extender and diaminosulphonate chain extender for 20-40 min at 10-50° C., and finally separating the acetone to obtain the aqueous PU dispersion, followed by thickening with a thickener.

11. A method for preparing the aqueous PU dispersion according to claim 2, wherein: prepolymer mixing process is used, comprising: step 1), adding polymer polyol, TMP, isocyanate monomer, catalyst, and organic solvent NMP in a reactor according to a formula, and reacting completely at 50-90° C.; and step 2), adding monofunctional alkoxy PEG or PPG according to the formula, and reacting completely at 50-90° C.; after cooling, dispersing the above reactants into deionized water at high speed, and reacting with non-ionic organic amine chain extender and diaminosulphonate chain extender for 20-40 min at 10-50° C. to obtain the aqueous PU dispersion, followed by thickening with a thickener; alternatively, acetone process is used, comprising: step 1), adding polymer polyol, TMP, isocyanate monomer, catalyst, and acetone in a reactor according to a formula, and reacting completely at 50-60° C.; and step 2), adding monofunctional alkoxy PEG or PPG according to the formula, and reacting completely at 50-60° C.; after cooling, dispersing the above reactants into deionized water at high speed, reacting with non-ionic organic amine chain extender and diaminosulphonate chain extender for 20-40 min at 10-50° C., and finally separating the acetone to obtain the aqueous PU dispersion, followed by thickening with a thickener.

12. A method for preparing the aqueous PU dispersion according to claim 3, wherein: prepolymer mixing process is used, comprising: step 1), adding polymer polyol, TMP, isocyanate monomer, catalyst, and organic solvent NMP in a reactor according to a formula, and reacting completely at 50-90° C.; and step 2), adding monofunctional alkoxy PEG or PPG according to the formula, and reacting completely at 50-90° C.; after cooling, dispersing the above reactants into deionized water at high speed, and reacting with non-ionic organic amine chain extender and diaminosulphonate chain extender for 20-40 min at 10-50° C. to obtain the aqueous PU dispersion, followed by thickening with a thickener; alternatively, acetone process is used, comprising: step 1), adding polymer polyol, TMP, isocyanate monomer, catalyst, and acetone in a reactor according to a formula, and reacting completely at 50-60° C.; and step 2), adding monofunctional alkoxy PEG or PPG according to the formula, and reacting completely at 50-60° C.; after cooling, dispersing the above reactants into deionized water at high speed, reacting with non-ionic organic amine chain extender and diaminosulphonate chain extender for 20-40 min at 10-50° C., and finally separating the acetone to obtain the aqueous PU dispersion, followed by thickening with a thickener.

13. A method for preparing the aqueous PU dispersion according to claim 4, wherein: prepolymer mixing process is used, comprising: step 1), adding polymer polyol, TMP, isocyanate monomer, catalyst, and organic solvent NMP in a reactor according to a formula, and reacting completely at 50-90° C.; and step 2), adding monofunctional alkoxy PEG or PPG according to the formula, and reacting completely at 50-90° C.; after cooling, dispersing the above reactants into deionized water at high speed, and reacting with non-ionic organic amine chain extender and diaminosulphonate chain extender for 20-40 min at 10-50° C. to obtain the aqueous PU dispersion, followed by thickening with a thickener; alternatively, acetone process is used, comprising: step 1), adding polymer polyol, TMP, isocyanate monomer, catalyst, and acetone in a reactor according to a formula, and reacting completely at 50-60° C.; and step 2), adding monofunctional alkoxy PEG or PPG according to the formula, and reacting completely at 50-60° C.; after cooling, dispersing the above reactants into deionized water at high speed, reacting with non-ionic organic amine chain extender and diaminosulphonate chain extender for 20-40 min at 10-50° C., and finally separating the acetone to obtain the aqueous PU dispersion, followed by thickening with a thickener.

14. A method for preparing the aqueous PU dispersion according to claim 5, wherein: prepolymer mixing process is used, comprising: step 1), adding polymer polyol, TMP, isocyanate monomer, catalyst, and organic solvent NMP in a reactor according to a formula, and reacting completely at 50-90° C.; and step 2), adding monofunctional alkoxy PEG or PPG according to the formula, and reacting completely at 50-90° C.; after cooling, dispersing the above reactants into deionized water at high speed, and reacting with non-ionic organic amine chain extender and diaminosulphonate chain extender for 20-40 min at 10-50° C. to obtain the aqueous PU dispersion, followed by thickening with a thickener; alternatively, acetone process is used, comprising: step 1), adding polymer polyol, TMP, isocyanate monomer, catalyst, and acetone in a reactor according to a formula, and reacting completely at 50-60° C.; and step 2), adding monofunctional alkoxy PEG or PPG according to the formula, and reacting completely at 50-60° C.; after cooling, dispersing the above reactants into deionized water at high speed, reacting with non-ionic organic amine chain extender and diaminosulphonate chain extender for 20-40 min at 10-50° C., and finally separating the acetone to obtain the aqueous PU dispersion, followed by thickening with a thickener.

15. A method for preparing the aqueous PU dispersion according to claim 6, wherein: prepolymer mixing process is used, comprising: step 1), adding polymer polyol, TMP, isocyanate monomer, catalyst, and organic solvent NMP in a reactor according to a formula, and reacting completely at 50-90° C.; and step 2), adding monofunctional alkoxy PEG or PPG according to the formula, and reacting completely at 50-90° C.; after cooling, dispersing the above reactants into deionized water at high speed, and reacting with non-ionic organic amine chain extender and diaminosulphonate chain extender for 20-40 min at 10-50° C. to obtain the aqueous PU dispersion, followed by thickening with a thickener; alternatively, acetone process is used, comprising: step 1), adding polymer polyol, TMP, isocyanate monomer, catalyst, and acetone in a reactor according to a formula, and reacting completely at 50-60° C.; and step 2), adding monofunctional alkoxy PEG or PPG according to the formula, and reacting completely at 50-60° C.; after cooling, dispersing the above reactants into deionized water at high speed, reacting with non-ionic organic amine chain extender and diaminosulphonate chain extender for 20-40 min at 10-50° C., and finally separating the acetone to obtain the aqueous PU dispersion, followed by thickening with a thickener.

16. A method for preparing the aqueous PU dispersion according to claim 7, wherein: prepolymer mixing process is used, comprising: step 1), adding polymer polyol, TMP, isocyanate monomer, catalyst, and organic solvent NMP in a reactor according to a formula, and reacting completely at 50-90° C.; and step 2), adding monofunctional alkoxy PEG or PPG according to the formula, and reacting completely at 50-90° C.; after cooling, dispersing the above reactants into deionized water at high speed, and reacting with non-ionic organic amine chain extender and diaminosulphonate chain extender for 20-40 min at 10-50° C. to obtain the aqueous PU dispersion, followed by thickening with a thickener; alternatively, acetone process is used, comprising: step 1), adding polymer polyol, TMP, isocyanate monomer, catalyst, and acetone in a reactor according to a formula, and reacting completely at 50-60° C.; and step 2), adding monofunctional alkoxy PEG or PPG according to the formula, and reacting completely at 50-60° C.; after cooling, dispersing the above reactants into deionized water at high speed, reacting with non-ionic organic amine chain extender and diaminosulphonate chain extender for 20-40 min at 10-50° C., and finally separating the acetone to obtain the aqueous PU dispersion, followed by thickening with a thickener.

17. A method for preparing the aqueous PU dispersion according to claim 8, wherein: prepolymer mixing process is used, comprising: step 1), adding polymer polyol, TMP, isocyanate monomer, catalyst, and organic solvent NMP in a reactor according to a formula, and reacting completely at 50-90° C.; and step 2), adding monofunctional alkoxy PEG or PPG according to the formula, and reacting completely at 50-90° C.; after cooling, dispersing the above reactants into deionized water at high speed, and reacting with non-ionic organic amine chain extender and diaminosulphonate chain extender for 20-40 min at 10-50° C. to obtain the aqueous PU dispersion, followed by thickening with a thickener; alternatively, acetone process is used, comprising: step 1), adding polymer polyol, TMP, isocyanate monomer, catalyst, and acetone in a reactor according to a formula, and reacting completely at 50-60° C.; and step 2), adding monofunctional alkoxy PEG or PPG according to the formula, and reacting completely at 50-60° C.; after cooling, dispersing the above reactants into deionized water at high speed, reacting with non-ionic organic amine chain extender and diaminosulphonate chain extender for 20-40 min at 10-50° C., and finally separating the acetone to obtain the aqueous PU dispersion, followed by thickening with a thickener.

18. A method for preparing the aqueous PU dispersion according to claim 9, wherein: prepolymer mixing process is used, comprising: step 1), adding polymer polyol, TMP, isocyanate monomer, catalyst, and organic solvent NMP in a reactor according to a formula, and reacting completely at 50-90° C.; and step 2), adding monofunctional alkoxy PEG or PPG according to the formula, and reacting completely at 50-90° C.; after cooling, dispersing the above reactants into deionized water at high speed, and reacting with non-ionic organic amine chain extender and diaminosulphonate chain extender for 20-40 min at 10-50° C. to obtain the aqueous PU dispersion, followed by thickening with a thickener; alternatively, acetone process is used, comprising: step 1), adding polymer polyol, TMP, isocyanate monomer, catalyst, and acetone in a reactor according to a formula, and reacting completely at 50-60° C.; and step 2), adding monofunctional alkoxy PEG or PPG according to the formula, and reacting completely at 50-60° C.; after cooling, dispersing the above reactants into deionized water at high speed, reacting with non-ionic organic amine chain extender and diaminosulphonate chain extender for 20-40 min at 10-50° C., and finally separating the acetone to obtain the aqueous PU dispersion, followed by thickening with a thickener.

\* \* \* \* \*